(12) United States Patent
Hiraguchi

(10) Patent No.: US 6,929,205 B2
(45) Date of Patent: Aug. 16, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/614,045

(22) Filed: Jul. 8, 2003

(65) Prior Publication Data

US 2004/0008443 A1 Jan. 15, 2004

(30) Foreign Application Priority Data

Jul. 9, 2002 (JP) ........................................ 2002-199556

(51) Int. Cl.⁷ ............................................ G11B 23/107
(52) U.S. Cl. ..................... 242/248; 242/332.4; 360/132
(58) Field of Search ............................. 242/332, 332.2, 242/332.4, 348, 348.2, 532.1; 360/132

(56) References Cited

U.S. PATENT DOCUMENTS 4,775,115 A * 10/1988 Gelardi .................... 242/348.2
6,331,922 B2 * 12/2001 Morita et al. ................ 360/132
6,437,938 B1 * 8/2002 Wada ....................... 242/332.4
6,505,789 B2 * 1/2003 Ridl et al. ................ 242/348.2
6,659,380 B2 * 12/2003 Shiga et al. ............. 242/348.2
6,761,327 B2 * 7/2004 Shiga et al. ............. 242/348.2

* cited by examiner

Primary Examiner—William A. Rivera
(74) Attorney, Agent, or Firm—Sughrue Mion, PLLC

(57) ABSTRACT

A recording tape cartridge in which, even if impact is applied to a vicinity of an opening due to a drop or the like, a leader pin does not fall out from pin holding portions. The recording tape cartridge has a case which rotatably accommodates a single reel on which a recording tape is wound; an opening for pulling-out of a leader pin attached to an end portion of the recording tape; and pin holding portions formed at an inner surface of a ceiling plate of the case and an inner surface of a floor plate of the case, and holding the leader pin in a vicinity of the opening. A plate thickness of at least regions directly above and directly below the leader pin which is held at the pin holding portions is thicker than an average plate thickness of the case.

14 Claims, 7 Drawing Sheets

RECORDING TAPE CARTRIDGE

CROSS-REFERENCE TO RELATED APPLICATION

This application claims priority under 35USC 119 from Japanese Patent Application No. 2002-199556, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly of computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, or a leader block, is provided at the distal end of the magnetic tape. A pull-out means provided at a drive device pulls the leader member out from an opening of the magnetic tape cartridge, and winds the magnetic tape, which is fixed to the leader member, onto a take-up reel of the drive device.

A reel gear is formed in an annular form in the center of the bottom surface of a reel which emerges from an open hole formed in the bottom surface of the magnetic tape cartridge. Due to a driving gear, which is provided at a rotating shaft of the drive device, meshing with this reel gear, the reel is driven to rotate. By rotating the reel of the magnetic tape cartridge and the take-up reel of the drive device synchronously, data can be recorded onto the magnetic tape, and data recorded on the magnetic tape can be played back.

Such a magnetic tape cartridge requires little space for storage, and a large amount of information can be recorded thereon. The position of the opening and the type of the door which opens and closes the opening differ for each type of leader member. For example, in the case of a leader pin, as shown in FIG. 7, an opening 68 for pulling out of a leader pin 60 is formed in a side wall 64 of a case 62. The opening 68 is opened and closed by a door 66 which slides in the direction of loading the magnetic tape cartridge into a drive device (the direction of arrow P) and the direction opposite thereto.

A pair of top and bottom pin holding portions 70, which hold the leader pin 60 when the magnetic tape cartridge is not being used (is being stored or the like) are provided at the inner side of the opening 68 of the case 62. The pin holding portions 70 are concave portions which are substantially semicircular as seen in plan view, and respective one portions of the pin holding portions 70 are open so that the leader pin 60 can enter therein and exit therefrom. Both end portions 60A of the leader pin 60, which is in a state of standing upright, are inserted into these concave portions (the pin holding portions 70).

However, when the pin holding portions 70 are formed in concave shapes in this way, the plate thickness at these portions is thin (about 1.0 mm), and these portions are portions which are weak in terms of strength. Namely, when the case 62 is dropped and a vicinity of the opening 68 hits the ground, there is the concern that the pin holding portions 70 will flexurally deform and that the leader pin 60 will fall out from the pin holding portions 70 due to the impact. If the leader pin 60 falls out from the pin holding portions 70, a problem arises in that the pull-out means of a drive device cannot pull the leader pin 60 out.

SUMMARY OF THE INVENTION

An object of the present invention is to provide a recording tape cartridge in which, even if impact is applied to a vicinity of an opening due to a drop or the like, a leader pin does not fall out from pin holding portions.

In order to achieve the above-described object, in accordance with one aspect of the present invention, there is provided a tape cartridge which can be inserted into a tape drive having an opening member which can operatively engage with the tape cartridge at a time when the tape cartridge is inserted, the tape cartridge comprising: a reel on which a tape is wound; a leader pin attached to a free end of the tape; a case which is hollow, which accommodates the reel, and which has a ceiling plate and a floor plate which oppose one another with a predetermined interval therebetween; a tape access opening provided at the case; and pin holding structures for releasably holding the leader pin at a predetermined holding position within the case, such that the leader pin spans between the ceiling plate and the floor plate, wherein a thickness of a portion of the ceiling plate and a portion of the floor plate which each may be contacted by an end surface of the leader pin which is positioned at the holding position, is thicker than an average thickness of the ceiling plate and the floor plate.

In accordance with another aspect of the present invention, there is provided a tape drive into which a tape cartridge can be inserted, and which carries out at least one of reading of data and writing of data, the tape cartridge having: a reel on which a tape is wound; a leader pin attached to a free end of the tape; a case which is hollow, which accommodates the reel, and which has a ceiling plate and a floor plate which oppose one another with a predetermined interval therebetween; a tape access opening provided at the case; and pin holding structures for releasably holding the leader pin at a predetermined holding position within the case, such that the leader pin spans between the ceiling plate and the floor plate, wherein a thickness of a portion of the ceiling plate and a portion of the floor plate which each may be contacted by an end surface of the leader pin which is positioned at the holding position, is thicker than an average thickness of the ceiling plate and the floor plate, and the tape drive has an opening member which can operatively engage with the tape cartridge at a time when the tape cartridge is inserted.

DETAILED DESCRIPTION OF THE INVENTION

Hereinafter, a recording tape cartridge 10 relating to an embodiment of the present invention will be described on the basis of FIGS. 1 through 6. First, the overall structure of the recording tape cartridge 10 will be briefly described, and then, main portions relating to the present invention will be described in detail. Note that, for convenience of explanation, the direction of loading the recording tape cartridge 10 into a drive device is denoted by arrow A, and this direction of arrow A is the forward direction (front side) of the recording tape cartridge 10. The direction of arrow B, which is orthogonal to the direction of arrow A, is the rightward direction.

Figure 1:
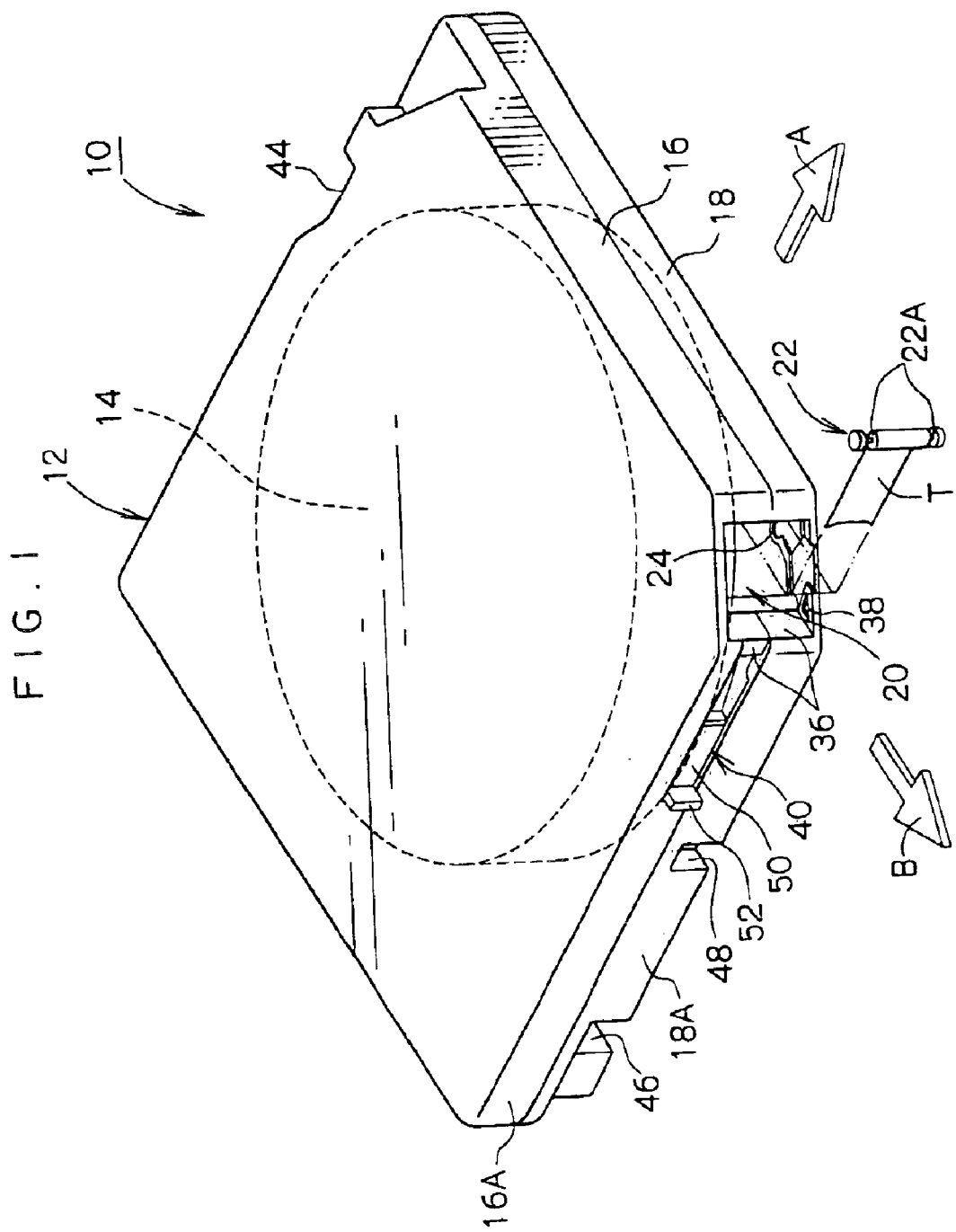
FIG. 1 is a schematic perspective view of a recording tape cartridge.
Figure 2:
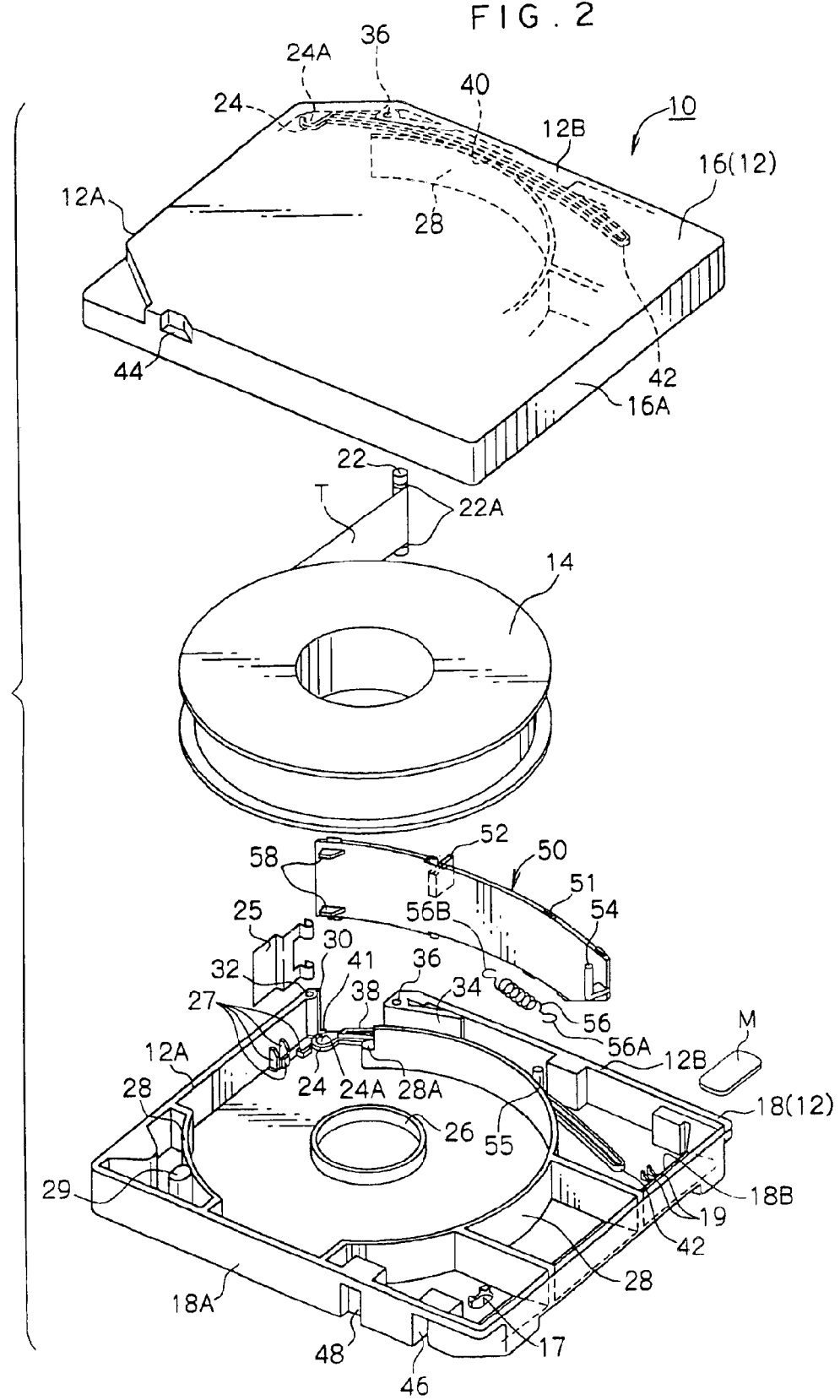
FIG. 2 is a schematic exploded perspective view of the recording tape cartridge.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off at an incline as seen in plan view. A space for accommodating the reel 14, on which the magnetic tape T is wound, is provided at the interior of the case 12.

Further, the corner portion of the upper case 16 and the lower case 18, at which corner portion the peripheral walls 16A, 18A have been cut off, forms an opening 20 which is for pulling-out of the magnetic tape T. A leader pin 22, which is pulled-out while being anchored (engaged) by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out means. In this way, the hooks or the like do not contact and scratch the magnetic tape T at the time of pulling-out the magnetic tape T.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by play restricting walls 28 which project out at portions of the inner surfaces of the upper case 16 and the lower case 18, and which serve as inner walls which are on a circular locus which is coaxial with the gear opening 26.

A bag portion 28A, in which a hole for position regulation is formed, is provided so as to be continuous with the end portion of the play restricting wall 28 in a vicinity of the opening 20. Further, a bag portion 29, in which is formed a hole for position regulation which is a long hole, is provided so as to be set apart from the play restricting wall 28 at the inner side of the front left corner portion of the case 12. The bag portions 28A, 29 are disposed on a single straight line which runs along the direction of arrow B. The end portions of the play restricting walls 28, except for the end portion thereof at which the bag portion 28A is continuous, are continuous with the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle and the memory board M is supported by supporting projections 19 so as to be inclined at a predetermined angle, such that sensing is possible at a drive device which reads from the bottom surface side and at a library device (a device which accommodates a plurality of the recording tape cartridges 10 and which automatically loads and removes the recording tape cartridges 10 into and from drive devices) which reads from the rear wall side.

An unillustrated write protect portion, which is set so that recording onto the recording tape cartridge 10 is possible or is not possible, is provided at the left rear portion of the lower case 18. An open hole 17, through which projects an operating projection (not illustrated) which operates the write protect portion, is formed in the left rear portion of the lower case 18.

A pair of top and bottom inclined wall portions 30, which are short and which prescribe the front edge portion of the opening 20, are provided at the right end portion of a front wall 12A of the case 12. The inclined wall portions 30 are bent along the plane of opening of the opening 20. The inclined wall portions 30 serve as dustproofing walls such that no gap through which dust or the like can enter arises, due to the distal end of a door 50, which is substantially arc-shaped in plan view and which will be described later, entering in at the inner side of the inclined wall portions 30 when the opening 20 is closed. Further, a pair of upper and lower screw bosses 32 are continuous with the inner side of the front wall 12A in vicinities of the left sides of the inclined wall portions 30.

A pair of upper and lower inclined wall portions 34, which are shaped, in plan view, so as to substantially follow along the outer peripheral surface of the door 50, are provided at the inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting-out the lower portion of the front side of the peripheral wall 16A of the upper case 16 which forms the right wall 12B, and the slit 40 opens toward the opening 20 as well. Forming the slit 40 in this way such that a portion of the peripheral wall 16A remains at the upper side is preferable in that the rigidity of the case 12 can be maintained. In particular, it is more preferable that the upper side wall prescribing the slit 40 be integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portion 48 is formed at the left wall of the case 12 as well. The concave portions 48 are engagement portions which, for example, a pull-in means of a drive device engages. The floor surfaces (the downwardly-facing surfaces) of the concave portions 48 serve as reference surfaces for positioning within a drive device.

Concave portions 46 are formed at the rear sides of the concave portions 48. The portion of the concave portion 46, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portions 46 are engagement portions which a grasping means of a library device engages. By providing the concave portions 46, 48, the torsional strength of the case 12 (the lower case 18) is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotational moment accompanying the movement of the door 50 in the direction of opening at the time of opening the opening 20.

Guide wall portions 42, which are predetermined heights (e.g., about 1.0 mm to 1.5 mm) and which support convex portions 51 of the door 50 (which will be described later) such that the convex portions 51 are nipped from both the inner surface side and the outer surface side, stand erect at the upper case 16 and the lower case 18 from a vicinity of the opening 20 to a vicinity of the region where the play restricting walls 28 are closest to the right wall 12B (hereinafter, these portions will be called the front half guide wall portions 42), and from a vicinity of the rear end of the slit 40 to a vicinity of the rear wall (hereinafter, these portions will be called the rear half guide wall portions 42).

The guide wall portions 42 are formed in substantial arc-shapes as seen in plan view, and have different lengths at the upper case 16 and the lower case 18. The guide wall portion 42 at the upper case 16 is formed such that the rear half side thereof is longer than that of the guide wall portion 42 at the lower case 18. This is because the memory board M is disposed so as to be inclined at a predetermined angle at the right wall 12B side of the rear portion inner wall 18B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22 (in the illustrated structure, positions which are about half of the opening width of the opening 20 and which are further rearward than pin holding portions 24 which will be described later).

Guide wall portions 41, whose rear end portions are open, stand erect in vicinities of the inclined wall portions 30 so as to be positioned on imaginary lines extending from the guide wall portions 42. The rear end portions of the guide wall portions 41 do not extend further rearward than the front ends of the pin holding portions 24 (which will be described later), so as to not impede the entry and exit of the leader pin 22. The interval (groove width) of the guide wall portion 41 is formed so as to be slightly more narrow than the interval (groove width) of the guide wall portion 42.

Namely, the interval (groove width) of the guide wall portion 42 is slightly wider so as to permit dispersion in molding of the door 50 (dispersion in the curvature). The convex portions 51 of the door 50 slide within the guide wall portions 42 in a state in which there is a certain amount of joggling. Accordingly, the interval (groove width) of at least the guide wall portion 41 is substantially the same size as the width of the convex portion 51 of the door 50 (the width including projections which will be described later). Due to the front most convex portions 51 being fit into the guide wall portions 41 when the opening 20 is closed, the door 50 can be held without joggling.

The guide wall portions 41 and the front half guide wall portions 42 are formed so as to be slightly lower than the rear half guide wall portions 42. Namely, for example, the heights of the guide wall portions 41 and the front half guide wall portions 42 are formed to be about 1 mm, whereas the heights of the rear half guide wall portions 42 are formed to be about 1.5 mm. This is in order to ensure, at the opening 20, space for entry of the pull-out means of a drive device which engages and pulls-out the leader pin 22. Accordingly, as will be described later, the plate width (height) of the front half portion of the door 50 (at least the portion thereof which closes the opening 20) is formed to be larger (higher) by an amount corresponding to the amount by which the guide wall portions 41 and the front half guide wall portions 42 are made lower.

Further, ribs 38, which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as these guide wall portions 42. The strength of the upper case 16 and the lower case 18 at the opening 20 portion is ensured by these ribs 38.

The upper case 16 and the lower case 18 which were described above are fixed (joined) together by unillustrated screws being screwed, from beneath, into the screw bosses 32, 36 which are positioned in the vicinities of the edge portions of the opening 20. In this way, the corner portions at both ends of the opening 20, which are prescribed by the free ends of the inclined wall portions 30 (the front wall 12A) and the inclined wall portions 34 (the right wall 12B) and which are disadvantageous in terms of strength and which easily hit the ground or the like when the case 12 is dropped, are joined together strongly. Even if the case 12 is dropped, it is difficult for the case 12 to deform or buckle, or for positional offset to arise thereat, due to the entire weight of the recording tape cartridge 10. Note that the abutting surfaces of the peripheral walls 16A, 18A (the corner portions at both sides of the opening 20) may be fixed together by welding. However, fixing together by screws is preferable in consideration of the ability to disassemble and the ability to recycle the case 12.

The opening 20 is opened and closed by the door 50 which serves as a shielding member. The plate width (height) of the portion of the door 50 which slides in the guide wall portions 41 and the front half guide wall portions 42 (i.e., at least the portion of the door 50 which closes the opening 20) is formed to be substantially the same as the opening height of the opening 20. The portion at the rear side thereof is formed to be slightly smaller (lower). The plate length of the door 50 is formed to be sufficiently larger than the opening width of the opening 20. The door 50 is formed in a substantial arc-shape as seen in plan view which curves along the direction of plate thickness, such that the door 50 can move along a predetermined circumference.

The curved longitudinal dimension of the door 50 is determined such that, in the state in which the door 50 closes the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut at an incline in order to avoid the memory board M which is disposed so as to be inclined at a predetermined angle at the rear portion inner wall 18B of the lower case 18. The inner surface and/or the outer surface at the distal end portion (front end portion) of the door 50 is preferably formed as a tapered surface so as to smoothly enter into the guide wall portions 41. In the illustrated structure, a taper surface 50A is formed at the outer surface side (see FIG. 5).

The convex portions 51 project from the top surface and the bottom surface of the door 50. The convex portions 51 abut the guide surfaces of the guide wall portions 41 and the guide wall portions 42 (the inner surfaces which oppose each other) and the inner surface of the upper case 16 and the inner surface of the lower case 18 between the guide wall portions 41 and the guide wall portions 42, and guide the door 50 in the directions of opening and closing the opening 20. The convex portions 51 are formed in substantially oval shapes as seen in plan view which are long along the longitudinal direction of the door 50. Four convex portions 51 project at each of the top surface and the bottom surface of the door 50 so as to have top/bottom symmetry (except for the convex portions 51 furthest toward the rear), and so as to project to substantially the same heights as the heights of the guide wall portions 41 and the guide wall portions 42 (for example, about 0.5 mm at the front side of a border portion where the plate width of the door 50 changes, and about 1.5 mm at the rear side of this border portion). Note that the convex portions 51 furthest toward the rear do not have top/bottom symmetry because the bottom rear portion of the door 50 is cut obliquely.

The distal end of the convex portion 51 is formed in a substantial arc-shape as seen in sectional view (side view). Projections (not illustrated), which are substantially arc-shaped in plan view or are substantially triangular in plan view or the like, project along the entire height of the convex portion 51 at the both side surfaces of the convex portion 51. Accordingly, when the convex portions 51 are inserted between the guide wall portions 42 and slide, only the substantially arc-shaped distal ends of the convex portions 51 contact the inner surface of the upper case 16 and the inner surface of the lower case 18 such that linear contact arises thereat, and only the substantially arc-shaped (or the like) distal ends of the projections contact the mutually opposing guide surfaces of the guide wall portions 42 such that linear contact similarly arises thereat.

Thus, the sliding resistance (friction) between, on the one hand, the top and bottom convex portions 51, and, on the other hand, the inner surface of the upper case 16 and the inner surface of the lower case 18 between the guide wall portions 41 and the guide wall portions 42 and the guide surfaces of the guide wall portions 41 and the guide wall portions 42, can be reduced, and the door 50 can be slid smoothly with little resistance. Note that, when the convex portions 51 are formed in substantially oval shapes as seen in plan view, the impact resistance thereof is better than if, for example, the convex portions 51 were to be formed in substantially circular shapes as seen in plan view. Thus, even if force is applied to the door 50 from a direction other than the opening/closing directions due to the impact of a drop or the like, there is no fear that the convex portions 51 will break.

An operation projection 52 serving as an operation portion projects along the radial direction of the door 50 from the outer peripheral surface of the door 50 at a region which is slightly further forward than the longitudinal direction central portion of the door 50 (i.e., at a vicinity of the border portion where the plate width of the door 50 changes). The operation projection 52 is exposed to the exterior of the case 12 from the slit 40. In the state in which the opening 20 is closed, the operation projection 52 is positioned so as to be slightly set apart from the rear end of the screw boss 36, and can be operated from the portion of the slit 40 which opens toward the front. Further, in the state in which the opening 20 is open, the operation projection 52 is positioned so as to be slightly set apart from the rear edge of the slit 40. At this time, the rear most convex portions 51 abut the rear end portions of the guide wall portions 42.

Although the interior and the exterior of the case 12 communicate via the slit 40 for exposing the operation projection 52, adhesion of dust and the like to the magnetic tape T wound on the reel 14 is prevented by the play restricting walls 28 serving as inner walls, and due to the fact that the slit 40 is always substantially closed by the screw boss 36 and by the door 50 which extends over substantially the entire height in the case 12.

Further, stoppers 58, which abut the upper end portion side surface and the lower end portion side surface of the leader pin 22 when the opening 20 is closed, project at the inner surface of the front end portion of the door 50. The stoppers 58 can even further prevent the leader pin 22 from falling out from the pin holding portions 24 (which will be described later) due to impact of a drop or the like. Further, a coil spring 56, which serves as an urging member which urges the door 50 in the direction of closing the opening 20, has a length such that it extends to the rear right corner portion of the case 12 in the state in which the door 50 closes the opening 20. Thus, the space between the play restricting walls 28 and the right wall 12B (the peripheral walls 16A, 18A) at the rear right corner portion can be utilized effectively.

Namely, a spring holding portion 54, which is substantially L-shaped in rear view, projects integrally at the inner peripheral surface of the door 50 in the vicinity of the rear end thereof, so as to be directed upwardly. A solid cylindrical spring anchor portion 55 projects upwardly at the inner surface of the lower case 18 in a vicinity of the concave portion 48. Ring-shaped attachment portions 56A, 56B are formed at the both ends of the coil spring 56. Accordingly, the one attachment portion 56B of the coil spring 56 is placed on the spring anchor portion 55 from above such that the spring anchor portion 55 is inserted through the attachment portion 56B, and the other attachment portion 56A is placed on the spring holding portion 54 from above such that the spring holding portion 54 is inserted through the attachment portion 56A. The coil spring 56 can thereby be attached simply within the aforementioned space.

A rib 57, which the top end of the spring holding portion 54 slidingly contacts at the time when the door 50 is opening and closing, stands erect in a substantial arc-shape in plan view at the upper case 16. The rib 57 is disposed at a position and has a length such that the top end of the spring holding portion 54 can slidingly contact the rib 57 at least when the door 50 starts to move (open). Due to the rib 57 suitably guiding the spring holding portion 54 which moves against the urging force of the coil spring 56, the door 50 can be opened more stably (i.e., at the time of opening, the door 50 does not shake due to the urging force of the coil spring 56).

Further, by providing the rib 57, even if the attachment portion 56A of the coil spring 56 rises up along the spring holding portion 54 due to an impact caused by a drop or the like being applied to the case 12, the attachment portion 56A does not come off of the spring holding portion 54. Note that the top end of the spring anchor portion 55 is inserted between the play restricting wall 28 and the guide wall portion 42 of the upper case 16. Thus, in the same way, the attachment portion 56B can be prevented from coming off of the spring anchor portion 55.

Figure 3:
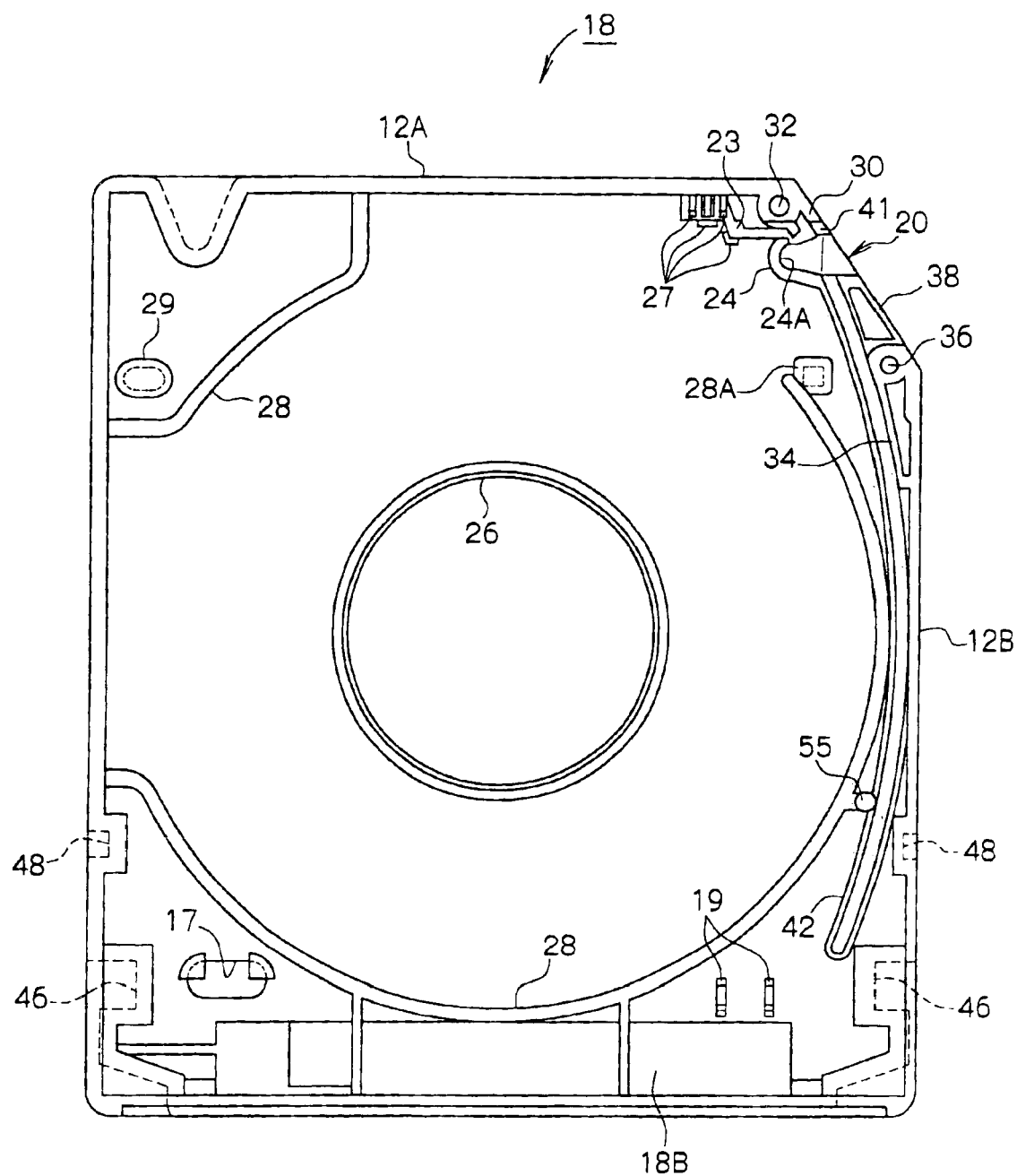
FIG. 3 is a schematic plan view of a lower case.
Figure 4:
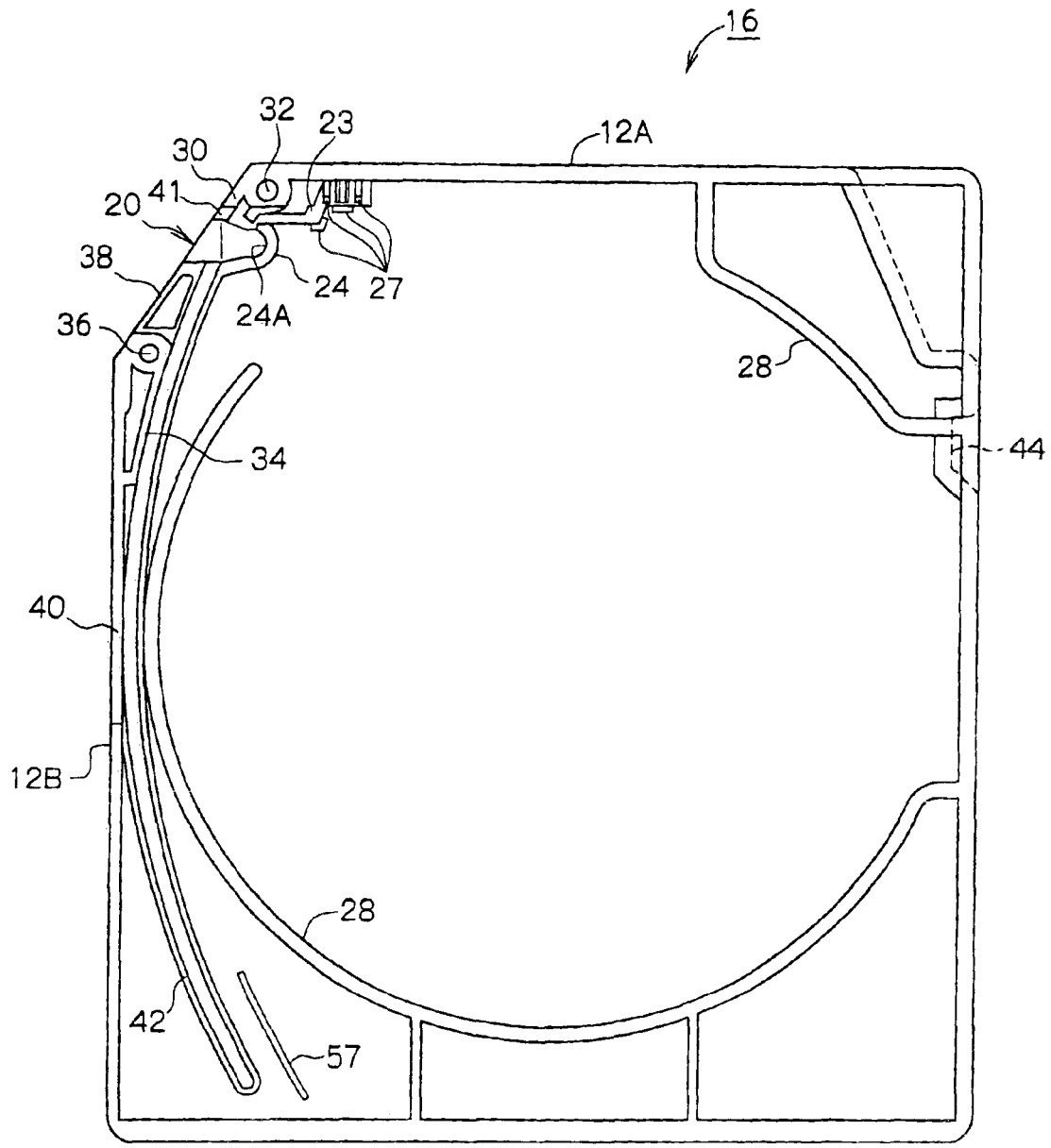
FIG. 4 is a schematic plan view of an upper case.
Figure 5:
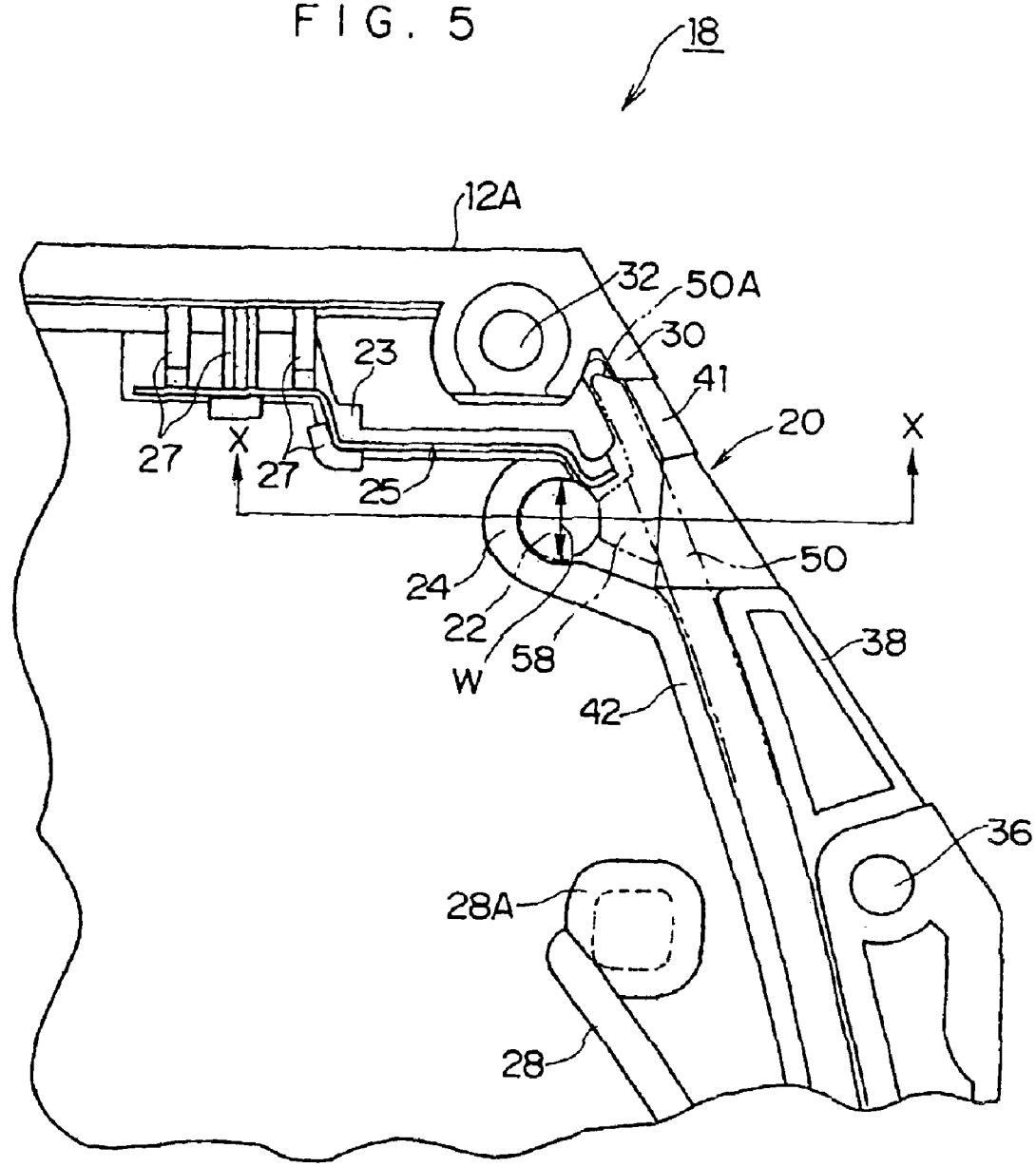
FIG. 5 is a schematic plan view showing a state in a vicinity of an opening.
Figure 6:
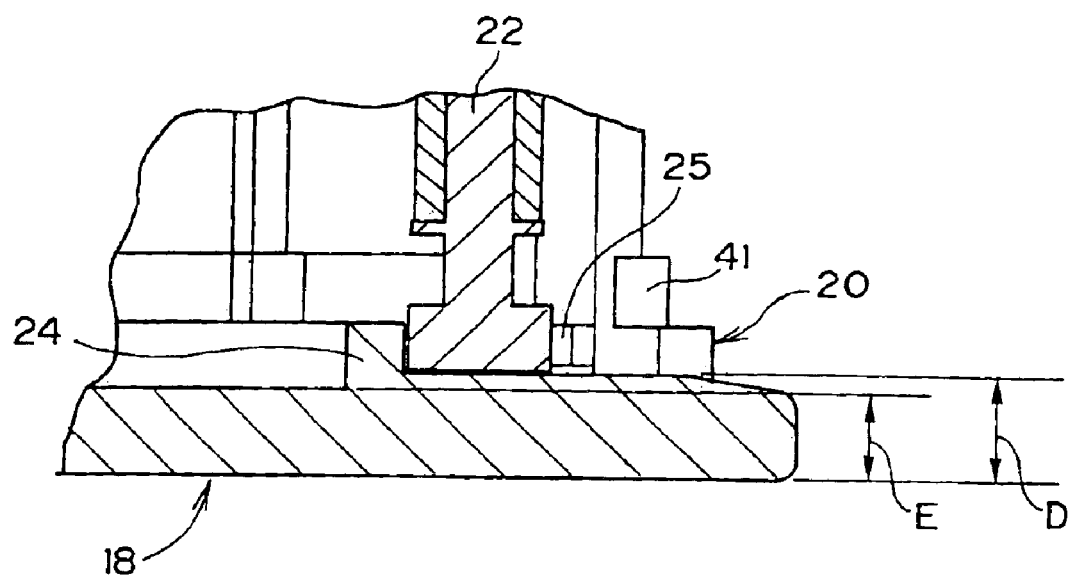
FIG. 6 is a schematic sectional view as seen in the direction of the arrows of line X—X in FIG. 5.
Figure 7:
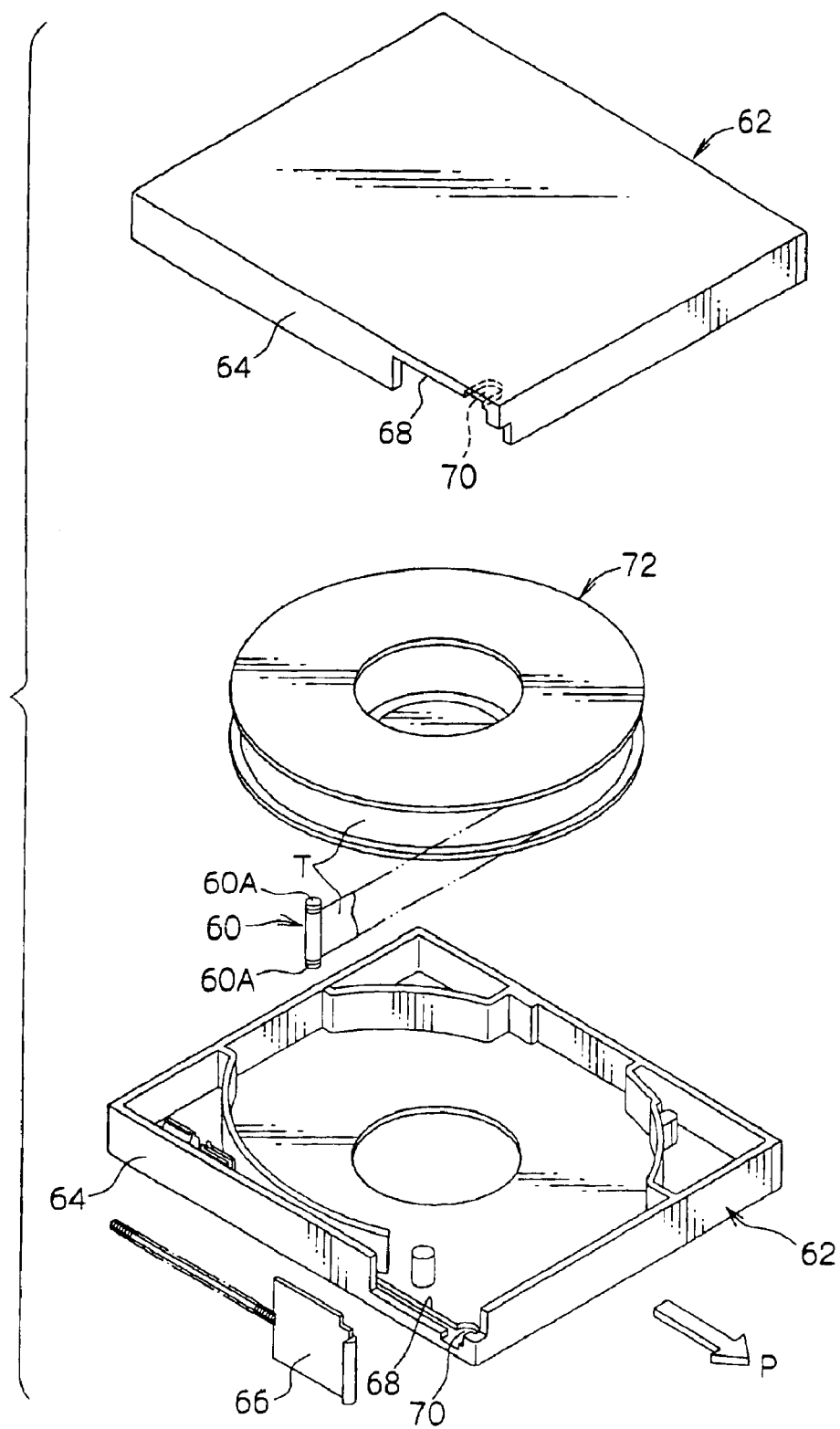
FIG. 7 is a schematic exploded perspective view of a conventional recording tape cartridge.

Next, the structure in the vicinity of the pin holding portions 24 relating to the present invention will be described. The pair of upper and lower pin holding portions 24, which position and hold the leader pin 22 within the case 12, are provided at the inner side of the opening 20 of the case 12, i.e., at the inner surface of the ceiling plate of the upper case 16 and at the inner surface of the floor plate of the lower case 18. As shown in FIGS. 3 through 5, the pin holding portions 24 are substantially semicylindrical, and the magnetic tape T pull-out sides thereof are open. The both end portions of the leader pin 22, which is in a state of standing upright, enter in and exit from concave portions 24A of the pin holding portions 24 from these open sides. Note that the pin holding portions 24 are integral and continuous with the guide wall portions 42 at the inner side. It is preferable that the heights of the pin holding portions 24 are formed to be substantially the same as or greater than the heights of the guide wall portions 42 with which they are integral and continuous.

Both the upper case 16 and the lower case 18 are molded such that the plate thickness of the areas at which the pin holding portions 24 are set (i.e., at least the areas directly above and directly below the leader pin 22 which is held by the pin holding portions 24) is thicker than the average plate thickness of the case 12. What is called the average plate thickness of the case 12 here is the average value of the plate thickness of the case 12, except for the convex portions and the concave portions such as the bag portions 28A, 29, the concave portions 46, 48, and the like, and is computed by the plate thicknesses of the ceiling plate of the upper case 16 and the floor plate of the lower case 18, and the plate thicknesses of the peripheral walls 16A, 18A, except for at the aforementioned areas.

Specifically, the average plate thickness of the case 12 (the average value of the plate thicknesses at the aforementioned places) is 2.0 mm. The plate thickness of the areas at which the pin holding portions 24 are set is thicker than that, e.g., is formed to be 2.3 mm. Namely, the ceiling plate of the upper case 16 and the floor plate of the lower case 18 may be molded in slanting shapes which, in cross-sectional view, gradually become thicker toward the areas at which the pin holding portions 24 are set, or portions the ceiling plate of the upper case 16 and the floor plate of the lower case 18 may be molded in convex shapes which protrude (swell) either outwardly or inwardly such that only these areas are thicker. Incidentally, in the structure illustrated in FIG. 6, the aforementioned area is molded so as to protrude (swell) inwardly, and such that the plate thickness D thereof is thicker than the plate thickness E of the lower case 18 (the average plate thickness of the case 12), other than at the aforementioned area.

In this way, by molding the areas at which the pin holding portions 24 are set to be thicker, it is possible to increase the strength in the vicinities of the pin holding portions 24 (the aforementioned areas), which are the positions at which the leader pin 22 is held (positioned) which are most important to the functioning of the recording tape cartridge 10 (in order for the pull-out means of the drive device to correctly anchor the leader pin 22 when pulling-out the magnetic tape T).

Thus, even if an impact is applied to the case 12 (the recording tape cartridge 10) due to a drop or the like, flexural deformation of these portions (the aforementioned areas) can be suppressed. The position of the leader pin 22 with respect to the pin holding portions 24 does not become offset, and the leader pin 22 does not fall out from the pin holding portions 24.

Here, the relationship between the plate thickness D and height H is shown in Table 1. The plate thickness D (see FIG. 6) is the plate thickness of the areas where the pin holding portions 24 are set (at least directly above and directly below the leader pin 22 which is held by the pin holding portions 24). The height H is a height at which it is possible to ensure the drop resistance strength at which the aforementioned areas do not flexurally deform (the position of the leader pin 22 does not become offset and the leader pin 22 does not fall out), at the time when the recording tape cartridge 10 is dropped from a vicinity of the opening 20. This data is data in the case of the recording tape cartridge 10 in which the material of the case 12 is polycarbonate, the total weight is 250 g, and the width (inner diameter) W (see FIG. 5) of the concave portion 24A is 3.3 mm.

TABLE 1

| plate thickness D | 1.0 mm | 1.5 mm | 2.0 mm | 2.3 mm | 2.5 mm |
| --- | --- | --- | --- | --- | --- |
| height H | 0.50 m | 0.75 m | 0.90 m | 1.00 m | 1.50 m |

As shown in Table 1, when the plate thickness D of the areas at which the pin holding portions 24 are set is 2.3 mm, the drop resistance strength can be ensured at a height H of exactly 1.00 m. The height of a desk is, on average, 0.60 m to 0.70 m. This height of 1.00 m corresponds to a height in a case in which a person seated at a desk lifts the recording tape cartridge 10 up with his/her hand, and drops it onto the floor, and is the height from which recording tape cartridges are most frequently dropped.

Accordingly, in the above-described recording tape cartridge 10, if the plate thickness D of the areas at which the pin holding portions 24 are set is ensured to be 2.3 mm or more, even if the recording tape cartridge 10 is accidentally dropped, the position of the leader pin 22 with respect to the pin holding portions 24 does not become offset, and the leader pin 22 does not fall out from the pin holding portions 24. Note that it is preferable that the positions at which the pin holding portions 24 are set are near to the screw bosses 32 as in the illustrated structure, because it is possible to even further prevent positional offset and falling out of the leader pin 22 due to vibrations of the ceiling plate of the upper case 16 and the floor plate of the lower case 18 which accompany dropping of the case 12 or the like.

Moreover, an anchor spring 25, which pushes the leader pin 22 such that the leader pin 22 does not fall out from the pin holding portions 24, is fixed in a vicinity of the pin holding portions 24 (the opening 20). The anchor spring 25 is shaped as a plate spring which is formed by bending a metal plate. As shown in FIG. 5, the top and bottom side edge portions of the anchor spring 25 are inserted into groove portions 23 which are provided at the front wall 12A and at the inner surface of the case 12 in a vicinity of the opening 20, and are held by a pair of upper and lower spring holding portions 27. (The front wall 12A is the portions of the peripheral walls 16A, 18A where the outer surfaces face in the direction of arrow A.)

The distal ends (free ends) of the anchor spring 25 are formed in substantial arc-shapes as seen in plan view. The curved surfaces thereof abut the upper and lower ends of the leader pin 22. Due to these distal ends pushing the upper and lower ends of the leader pin 22 toward the inner sides of the concave portions 24A of the pin holding portions 24, the leader pin 22 is held in the pin holding portions 24. Note that, when the leader pin 22 enters into and exits from the pin holding portions 24, the distal ends of the anchor spring 25 elastically deform appropriately so as to permit movement of the leader pin 22.

Next, operation of the present embodiment will be described. When the recording tape cartridge 10 having the above-described structure is not being used (i.e., is being stored, is being transported, or the like), the opening 20 is closed by the door 50. Specifically, due to the urging force of the coil spring 56, the door 50 is always urged in the direction of closing the opening 20, and closes the opening 20 in a state in which the distal end portion (front end portion) of the door 50 has entered in the guide wall portions 41 which are in a vicinity of the inclined wall portions 30.

On the other hand, when the magnetic tape T is to be used, the recording tape cartridge 10 is loaded into a drive device along the direction of arrow A. Accompanying this loading, an opening/closing member (not illustrated) forming an opening/closing means of the drive device enters into the slit 40 which opens toward the front, and engages with the operation projection 52 of the door 50. In this state, when the recording tape cartridge 10 (the case 12) is pushed in further, due to the pushing-in force, the opening/closing member moves the operation projection 52 rearward against the urging force of the coil spring 56 (i.e., moves the operation projection 52 rearward relative to the case 12 which is loaded in the direction of arrow A). The opening/closing member extends in a direction traversing the direction of insertion of the cartridge.

Then, while the convex portions 51 are guided by the guide wall portions 42 and the spring holding portion 54 is guided by the rib 57, the door 50, from which the operation projection 52 projects, rotates clockwise as seen in plan view along the direction of curving thereof. Namely, due to the guide wall portions 42, the door 50 moves substantially rearward so as to circle around the outer sides of the pin holding portions 24 and the reel 14 without jutting out from the locus of movement along the curved configuration of the door 50, and opens the opening 20. Then, when the case 12 (the recording tape cartridge 10) is loaded to a predetermined depth in the drive device, the opening 20 is completely opened.

When the recording tape cartridge 10 is positioned within the drive device in this state in which the opening 20 is opened, further rotation (substantially rearward movement) of the door 50 is restricted. The pull-out means of the drive device enters into the case 12 from the opening 20 which has been opened. The pull-out means pulls-out the leader pin 22 which is positioned and held at the pin holding portions 24. At this time, the distal ends of the anchor spring 25 elastically deform appropriately, such that pulling-out of the leader pin 22 from the pin holding portions 24 is permitted. Then, the leader pin 22 is accommodated at a take-up reel (not shown), and the take-up reel and the reel 14 are driven to rotate synchronously. Thus, the magnetic tape T is successively pulled-out from the case 12 while being taken-up onto the take-up reel. Information is recorded or played back by a recording/playback head or the like disposed along a predetermined tape path.

On the other hand, when the magnetic tape T is rewound onto the reel 14 and the leader pin 22 is to be held at the pin holding portions 24, the distal ends of the anchor spring 25 elastically deform appropriately such that entry of the leader pin 22 into the pin holding portions 24 is permitted. When the recording tape cartridge 10 is to be ejected from the drive device, the positioned state of the recording tape cartridge 10 is cancelled, and the recording tape cartridge 10 is moved in the direction opposite to the direction of arrow A by the urging force of the coil spring 56 or by an unillustrated ejecting mechanism. In this way, the door 50 is rotated in the direction of closing the opening 20 by the urging force of the coil spring 56, while the convex portions 51 are guided by the guide wall portions 42. Due to the distal end portion (front end portion) of the door 50 entering into the guide wall portions 41, the opening 20 is completely closed and returned to its initial state.

Here, the plate thickness of the areas at which the pin holding portions 24 are set (i.e., at least the areas directly above and directly below the leader pin 22 which is held at the pin holding portions 24) is formed to be thicker than the average plate thickness of the case 12 (2.0 mm). (For example, the plate thickness of the aforementioned areas is formed to be 2.3 mm.) Thus, the strength of the case at these areas can be improved. The strength of the case at these areas is also improved by upper case 16 and the lower case 18 being screwed together at the screw bosses 32, 36. Accordingly, for example, in the case of the above-described recording tape cartridge 10 in which the plate thickness of the aforementioned area is formed to 2.3 mm, even if this recording tape cartridge 10 is dropped from a height of 1.00 m, it is possible to suppress plastic deformation, breakage and the like of the aforementioned areas due to a drop. It is possible to prevent the position of the leader pin 22 with respect to the pin holding portions 24 from becoming offset and the leader pin 22 from falling out of the pin holding portions 24.

In this way, in accordance with the present invention, the strength of a case in a vicinity of pin holding portions can be improved. Thus, even if an impact is applied to a vicinity of an opening due to a drop or the like, flexural deformation of this portion can be suppressed. Accordingly, the position of a leader pin with respect to the pin holding portions does not become offset, and the leader pin does not fall out from the pin holding portions.

What is claimed is:

1. A tape cartridge which can be inserted into a tape drive having an opening member which can operatively engage with the tape cartridge at time when the tape cartridge is inserted, the tape cartridge comprising:
a reel on which a tape is wound;
a leader pin attached to a free end of the tape;
a case which is hollow, which accommodates the reel, and which has a ceiling plate and a floor plate which oppose one another with a predetermined interval therebetween;
a tape access opening provided at the case;
pin holding structures for releasably holding the leader pin at a predetermined holding position within the case, such that the leader pin spans between the ceiling plate and the floor plates;
a shielding member which can move reciprocatingly along an arc-shaped path of movement between a closing position for closing the tape access opening and an opening position for opening the tape access opening,
wherein a thickness of a portion of the ceiling plate and a portion of the floor plate which each may be contacted by an end surface of the leader pin which is positioned at the holding position, is thicker than an average thickness of the ceiling plate and the floor plate.

2. The tape cartridge of claim 1, wherein the thickness of the portion of the ceiling plate and the portion of the floor plate at least 2.3 mm.

3. The tape cartridge of claim 1, wherein the holding position is in a vicinity of the tape access opening within the case.

4. The tape cartridge of claim 1, wherein the case has a front wall portion facing in a cartridge insertion direction, a side wall portion substantially parallel to the cartridge insertion direction, and an inclined wall portion connecting the front wall portion and the side wall portion and inclined with respect to the cartridge insertion direction, and the tape access opening is provided at the inclined wall portion of the case.

5. The tape cartridge of claim 1, wherein the pin holding structure has an elastic member which has a free end portion and a proximal portion, and which is for pushing the leader pin by the free end portion and positioning the leader pin at the holding position.

6. The tape cartridge of claim 1, further comprising an urging element which always urges the shielding member toward the closing position.

7. The tape cartridge of claim 1, further comprising an operation portion provided at the shielding member, and due to the tape cartridge being inserted, the operation portion can move the shielding member toward the opening position while engaging with the opening member of the tape drive.

8. The tape cartridge of claim 1, wherein the case is substantially rectangular in plan view.

9. The tape cartridge of claim 1, wherein the case is formed from an upper case; and a plurality of joining portions for joining the upper case and the lower case are provided at the case.

10. A tape drive into which a tape cartridge can be inserted, and which carries out at least one of reading of data and writing of data, the tape cartridge having:

a reel on which a tape is wound;

a leader pin attached to a free end of the tape;

a case which is hollow, which accommodates the reel, and which has a ceiling plate and a floor plate which oppose one another with a predetermined interval therebetween;

a tape access opening provided at the case; and pin holding structures for releasably holding the leader pin at a predetermined holding position within the case, such that the leader pin spans between the ceiling plate and the floor plate, wherein a thickness of a portion of the ceiling plate and a portion of the floor plate which each may be contacted by an end surface of the leader pin which is positioned at the holding position, is thicker than an average thickness of the ceiling plate and the floor plate, and the tape drive has an opening member which can operatively engage with the tape cartridge at a time when the tape cartridge is inserted, wherein the opening member enters into the case at the time when the tape cartridge is inserted.

11. The tape drive of claim 10, wherein, at the time when the tape cartridge is inserted, the opening member engages with a shielding member and can move the shielding member toward an opening position.

12. The tape drive of claim 10, wherein the opening member extends in a direction traversing a tape cartridge insertion direction.

13. The tape drive of claim 10, wherein the opening member enters in from a slit provided at the case.

14. A tape cartridge which can be inserted into a tape drive having an opening member which can operatively engage with the tape cartridge at a time when the tape cartridge is inserted, the tape cartridge comprising:

a reel on which a tape is wound;

a leader pin attached to a free end of the tape;

a case which is hollow, which accommodates the reel, and which has ceiling plate and a floor plate which oppose one another with a predetermined interval therebetween;

a tape access opening provided at the case; and pin holding structures for releasably holding the leader pin at a predetermined holding position within the case, such that the leader pin spans between the ceiling plate and the floor plate, wherein a thickness of a portion of the ceiling plate and a portion of the floor plate which each may be contacted by an end surface of the leader pin which is positioned at the holding position, is thicker than an average thickness of the ceiling plate and the floor plate, and wherein the pin holding structure has an elastic member which has a free end portion and a proximal portion, and which is for pushing the leader pin by the free end portion and positioning the leader pin at the holding position.

* * * * *